(12) United States Patent
Kidesaki

(10) Patent No.: US 12,030,270 B2
(45) Date of Patent: Jul. 9, 2024

(54) TIRE MOLDING DIE AND PNEUMATIC TIRE

(71) Applicant: The Yokohama Rubber Co., LTD., Tokyo (JP)

(72) Inventor: Takashi Kidesaki, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 401 days.

(21) Appl. No.: 17/615,439

(22) PCT Filed: May 8, 2020

(86) PCT No.: PCT/JP2020/018745
§ 371 (c)(1),
(2) Date: Nov. 30, 2021

(87) PCT Pub. No.: WO2020/246199
PCT Pub. Date: Dec. 10, 2020

(65) Prior Publication Data
US 2022/0227085 A1   Jul. 21, 2022

(30) Foreign Application Priority Data
Jun. 4, 2019   (JP) ................................. 2019-104877

(51) Int. Cl.
*B29D 30/06*   (2006.01)
(52) U.S. Cl.
CPC .. *B29D 30/0606* (2013.01); *B29D 2030/0613* (2013.01)

(58) Field of Classification Search
None
See application file for complete search history.

(56) References Cited

U.S. PATENT DOCUMENTS

| | | | |
|---|---|---|---|
| 5,327,953 A * | 7/1994 | Ichiki | B29D 30/0606 152/902 |
| 10,099,441 B2 * | 10/2018 | Takahashi | B29D 30/0601 |
| 10,343,464 B2 * | 7/2019 | Kaji | B29D 30/06 |
| 2013/0328240 A1 * | 12/2013 | Takahashi | B60C 11/1218 264/293 |

(Continued)

FOREIGN PATENT DOCUMENTS

| | | |
|---|---|---|
| JP | 05-024417 A | 2/1993 |
| JP | 2009-255734 A | 11/2009 |

(Continued)

*Primary Examiner* — Xiao S Zhao
*Assistant Examiner* — Nicholas J Chidiac
(74) *Attorney, Agent, or Firm* — Thorpe North & Western

(57) ABSTRACT

A tire molding die includes sectors separated from one another in a tire circumferential direction, and sipe blades disposed on tread molding surfaces of the sectors, the sipe blades are disposed repeatedly in the tire circumferential direction in a repeating pattern corresponding to a predetermined arrangement pattern, and a near sipe blade that is included in sipe blades disposed in one of the sectors and that is a sipe blade closest to a division position between the sectors is more rigid than an original shape blade corresponding to the sipe blade provided in the repeating pattern differing from the repeating pattern including the near sipe blade at a position identical to a position of the near sipe blade in the repeating pattern including the near sipe blade.

10 Claims, 12 Drawing Sheets

(56) References Cited

U.S. PATENT DOCUMENTS

| | | | |
|---|---|---|---|
| 2016/0185161 A1* | 6/2016 | Kaji | B60C 11/1272 425/28.1 |
| 2016/0185162 A1* | 6/2016 | Kaji | B29D 30/68 425/28.1 |
| 2019/0100058 A1* | 4/2019 | Kaji | B60C 11/0306 |
| 2022/0297480 A1* | 9/2022 | Kidesaki | B60C 11/11 |
| 2022/0305750 A1* | 9/2022 | Kitahara | B29D 30/0662 |
| 2023/0001743 A1* | 1/2023 | Tomida | B60C 11/1272 |

FOREIGN PATENT DOCUMENTS

| | | |
|---|---|---|
| JP | 2012-011690 A | 1/2012 |
| JP | 2013-252690 A | 12/2013 |

\* cited by examiner

| | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|---|
| RIGIDITY OF NEAR SIPE BLADE RELATIVE TO RIGIDITY OF ORIGINAL SHAPE BLADE | IDENTICAL | HIGH | HIGH | HIGH | HIGH | HIGH | HIGH | HIGH | HIGH |
| MAXIMUM HEIGHT H2 OF ORIGINAL SHAPE BLADE | 7 mm | 7 mm | 7 mm | 7 mm | 7 mm | 7 mm | 7 mm | 7 mm | 7 mm |
| MAXIMUM HEIGHT H1 OF NEAR SIPE BLADE | 7 mm | 7 mm | 6 mm | 2 mm | 4 mm | 4 mm | 4 mm | 4 mm | 4 mm |
| H1/H2 | 1.0 | 1.0 | 0.86 | 0.29 | 0.57 | 0.57 | 0.57 | 0.57 | 0.57 |
| SIPE VOLUME OF NEAR SIPE BLADE V ∝ H1 | NO | NO | NO | NO | NO | YES | YES | YES | YES |
| NUMBER A2 OF BEND POINTS OF ORIGINAL SHAPE BLADE | 6 | 6 | 6 | 6 | 6 | 6 | 6 | 6 | 6 |
| NUMBER A1 OF BEND POINTS OF NEAR SIPE BLADE | 6 | 6 | 6 | 6 | 6 | 6 | 8 | 8 | 8 |
| MATERIAL STRENGTH S1 OF NEAR SIPE BLADE/MATERIAL STRENGTH S2 OF ORIGINAL SHAPE BLADE | 1.0 | 1.3 | 1.0 | 1.0 | 1.0 | 1.0 | 1.0 | 1.3 | 1.3 |
| SURFACE ROUGHNESS R1 OF NEAR SIPE BLADE/SURFACE ROUGHNESS R2 OF ORIGINAL SHAPE BLADE | 1.0 | 1.0 | 1.0 | 1.0 | 1.0 | 1.0 | 1.0 | 1.0 | 0.7 |
| DURABILITY OF MOLD | 100 | 110 | 125 | 140 | 200 | 250 | 300 | 500 | NO BENDING |

FIG. 12

TIRE MOLDING DIE AND PNEUMATIC TIRE

TECHNICAL FIELD

The present technology relates to a tire molding die and a pneumatic tire.

BACKGROUND ART

Some known pneumatic tires are provided with so-called sipes, which are cuts formed in a tread portion, in order to improve performance on ice and snow, which is running performance on snowy roads and frozen road surfaces, and wet performance, which is running performance on wet road surfaces, and the like. For example, in studless tires, which are required to have running performance on icy and snowy road surfaces, a large number of sipes on the road contact surface of the tread portion are disposed. Additionally, the pneumatic tire is manufactured by vulcanization molding using a tire molding die divided into a plurality of sectors in the tire circumferential direction. However, various defects are likely to occur during vulcanization molding at division positions of sectors, and thus, some known tire molding dies are designed to eliminate such defects.

For example, in a tire vulcanization mold described in Japan Unexamined Patent Publication No. 2012-011690, a turning point is provided on sipe blades disposed adjacent to the division positions of sectors. By modifying a portion from the turning point to the other end of the sipe blade further away from the division position than the original shape, separation of and damage to the sipe blade and the like are prevented during vulcanization release. Additionally, in a tire molding die described in Japan Unexamined Patent Publication No. 2009-255734, by making the sipe volume of the sipe forming blade at the end portion position of the sector greater than the sipe volume of the sipe forming blade at the central portion position of the sector, uneven wear of a land portion at or near the division position of sectors is effectively suppressed.

In this regard, in a tire molding die in which sipe blades are disposed in each of the sectors separated from one another, the blades are likely to be twisted in a case where the tire is detached from the mold after vulcanization molding of the tire. In particular, because the twist occurring in the blades is significant at or near the division position of sectors, the twist may cause failure such as bending or breakage of the blades. As described above, in the known tire molding dies that include a plurality of the sectors separated from one another in the tire circumferential direction and in which the sipe blades are disposed, there is room for improvement in terms of durability due to the likelihood of failure in the blades disposed at or near the division position of sectors.

SUMMARY

The present technology provides a tire molding die and a pneumatic tire that can improve durability of sipe blades.

A tire molding die according to an embodiment of the present technology includes a plurality of sectors separated from one another in a tire circumferential direction, and a plurality of sipe blades disposed on tread molding surfaces of the sectors, the sipe blades are disposed repeatedly in the tire circumferential direction in a repeating pattern corresponding to a predetermined arrangement pattern, a near sipe blade that is included in a plurality of the sipe blades disposed in one of the sectors and that is closest to a division position between the sectors being more rigid than an original shape blade corresponding to the sipe blade provided in the repeating pattern differing from the repeating pattern including the near sipe blade at a position identical to a position of the near sipe blade in the repeating pattern including the near sipe blade.

Additionally, in the tire molding die described above, preferably, a maximum height of the near sipe blade is smaller than a maximum height of the original shape blade.

Additionally, in the tire molding die described above, preferably, a ratio of a maximum height $H1$ of the near sipe blade to a maximum height $H2$ of the original shape blade is in a range $0.3 \leq (H1/H2) \leq 0.8$.

Additionally, in the tire molding die described above, preferably, the near sipe blade has a relationship between the maximum height $H1$ and a sipe volume $V$ corresponding to a product of a length $L$, a width $W$, and the maximum height $H1$ of the near sipe blade such that $V \propto H1$.

Additionally, in the tire molding die described above, preferably, the near sipe blade and the original shape blade have a relationship between a number of bend points $A1$ of the near sipe blade and a number of bend points $A2$ of the original shape blade such that $A2 < A1$.

Additionally, in the tire molding die described above, preferably, the near sipe blade and the original shape blade have a relationship between a material strength $S1$ of the near sipe blade and a material strength $S2$ of the original shape blade such that $S2 < S1$.

Additionally, in the tire molding die described above, preferably, the near sipe blade and the original shape blade have a relationship between a surface roughness $R1$ of the near sipe blade and a surface roughness $R2$ of the original shape blade such that $R2 > R1$.

The pneumatic tire according to an embodiment of the present technology is vulcanized using the tire molding die described above.

The tire molding die and pneumatic tire according to an embodiment of the present technology have the effect of improving the durability of the sipe blades.

BRIEF DESCRIPTION OF DRAWINGS

FIG. 12 is a table showing results of performance evaluation tests of the tire molding die.

DETAILED DESCRIPTION

A tire molding die and a pneumatic tire according to embodiments of the present technology will be described in detail below with reference to the drawings. However, the present technology is not limited by the embodiment. Constituents of the following embodiments include elements that are essentially identical or that can be substituted or easily conceived of by a person skilled in the art.

Embodiments

In the following description, the tire radial direction refers to a direction orthogonal to the rotation axis (not illustrated) of a pneumatic tire 1, the inner side in the tire radial direction refers to the side facing the rotation axis in the tire radial direction, and the outer side in the tire radial direction refers to the side away from the rotation axis in the tire radial direction. Moreover, the tire circumferential direction refers to the circumferential direction with the rotation axis as the central axis. Additionally, the tire width direction refers to a direction parallel with the rotation axis, the inner side in the tire width direction refers to a side toward the tire equatorial plane (tire equator line) CL in the tire width direction, and the outer side in the tire width direction refers to a side away from the tire equatorial plane CL in the tire width direction. The tire equatorial plane CL is a plane that is orthogonal to the rotation axis of the pneumatic tire 1 and passes through the center of the tire width of the pneumatic tire 1, and in the tire equatorial plane CL, the center line in the tire width direction, which is the center position of the pneumatic tire 1 in the tire width direction, coincides with the position in the tire width direction. The tire width is the width in the tire width direction between portions located on the outermost sides in the tire width direction, or in other words, the distance between the portions that are the most distant from the tire equatorial plane CL in the tire width direction. The term "tire equator line" refers to a line in the tire circumferential direction of the pneumatic tire 1 that lies on the tire equatorial plane CL.

Pneumatic Tire

Figure 1:
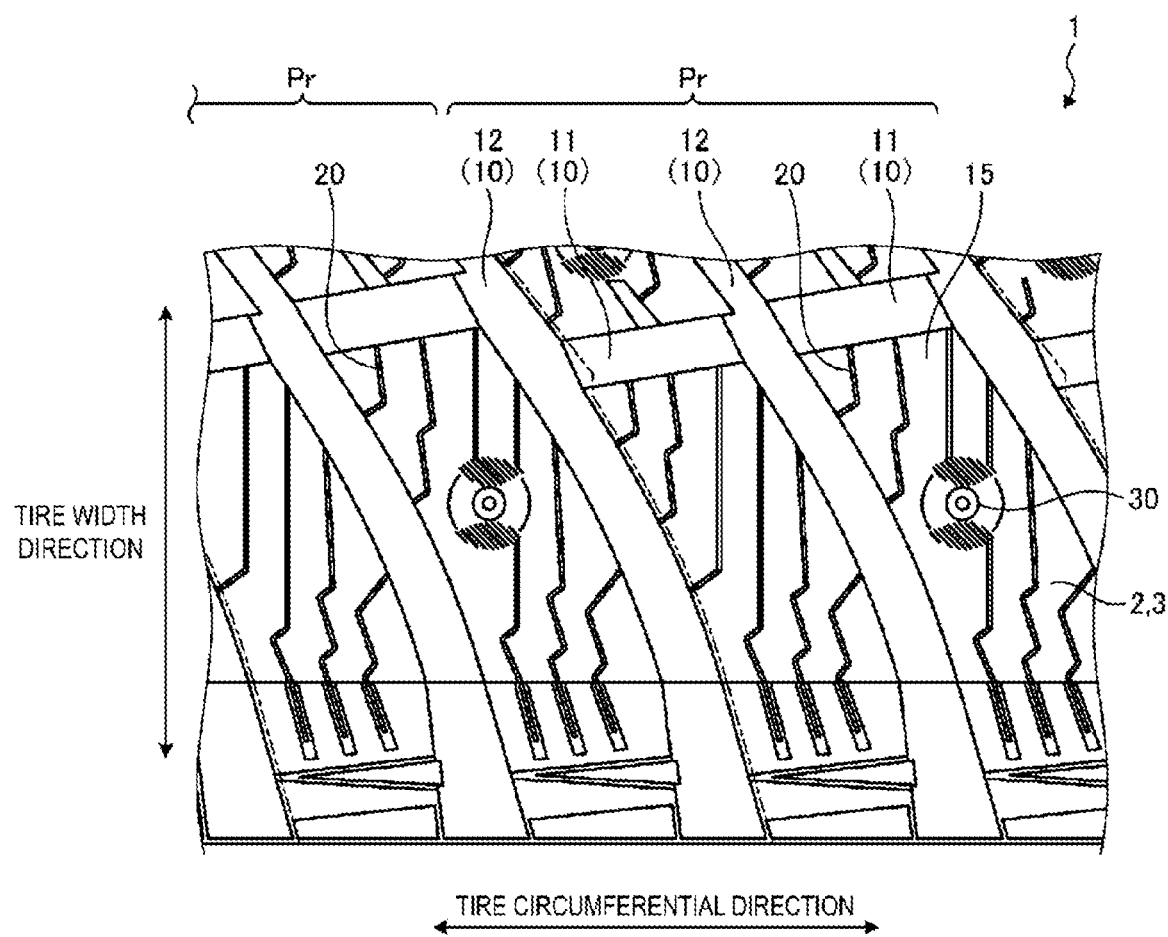
FIG. 1 is a plan view illustrating a road contact surface of a tread portion of a pneumatic tire according to an embodiment.

FIG. 1 is a plan view of a road contact surface 3 of a tread portion 2 of the pneumatic tire 1 according to an embodiment. The pneumatic tire 1 illustrated in FIG. 1 includes the tread portion 2 disposed at the outermost portion of the pneumatic tire 1 in the tire radial direction. The surface of the tread portion 2, in other words, a portion that comes into contact with a road surface when a vehicle (not illustrated) equipped with the pneumatic tire 1 travels is formed as the road contact surface 3. A plurality of grooves 10 are formed in the road contact surface 3, and a plurality of land portions 15 are defined by a plurality of grooves 10. The grooves 10 include, for example, a plurality of circumferential grooves 11 extending in the tire circumferential direction and a plurality of lug grooves 12 extending in the tire width direction. In the present embodiment, the lug grooves 12 are inclined in the tire circumferential direction while extending in the tire width direction, and the circumferential grooves 11 are formed between adjacent lug grooves 12 in the tire circumferential direction. The land portions 15 are block-shaped by the circumferential grooves 11 and the lug grooves 12.

Additionally, a plurality of sipes 20 are formed in the road contact surface 3. The sipes 20 described herein are formed in a narrow groove shape in the ground contact surface 3. In the sipes 20, when the pneumatic tire 1 is mounted on a regular rim, inflated to a regular internal pressure, and in an unloaded state, wall surfaces constituting the narrow groove do not contact one another, whereas in a case where the narrow groove is located in a portion of the ground contact surface formed on a flat plate in response to application of a load on the flat plate in the vertical direction or in a case where the land portion 15 provided with the narrow groove flexes, the wall surfaces constituting the narrow groove or at least parts of portions provided on the wall surface contact one another due to deformation of the land portion 15. Here, "regular rim" refers to a standard rim defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). Moreover, a regular internal pressure refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO.

The sipes 20 are formed extending in the tire width direction at a predetermined depth, and are provided in each of the land portions 15 defined by the grooves 10. Some of the sipes 20 bend in the tire circumferential direction while extending in the tire width direction and the sipes 20 vary in form. Additionally, the sipes 20 are disposed repeatedly in the tire circumferential direction in repeating patterns Pr corresponding to predetermined arrangement patterns. The repeating patterns Pr in this case are each configured by combining a plurality of the sipes 20, and have an equal shape of the sipes 20 constituting the repeating pattern Pr, an equal number of the sipes 20, and an equal relative positional relationship among the sipes 20. In the present embodiment, a plurality of the sipes 20 disposed in a range in which the length of the repeating pattern Pr in the tire circumferential direction is identical to the length of the interval between two lug grooves 12 are formed as one repeating pattern Pr.

Additionally, pin holes 30 are formed in the road contact surface 3 of the tread portion 2 and used as holes in which stud pins (not illustrated) are disposed. A plurality of the pin holes 30 are formed in the road contact surface 3 regardless of a tread pattern such as the repeating pattern Pr of the sipes 20.

Tire Molding Die

Now, a tire molding die 100 according to the embodiment will be described. Note that in the following description, the tire radial direction of the pneumatic tire 1 will be described as the tire radial direction in the tire molding die 100 and that the tire width direction of the pneumatic tire 1 will be described as the tire width direction of the tire molding die 100 and that the tire circumferential direction of the pneumatic tire 1 will be described as the tire circumferential direction in the tire molding die 100.

Figure 2:
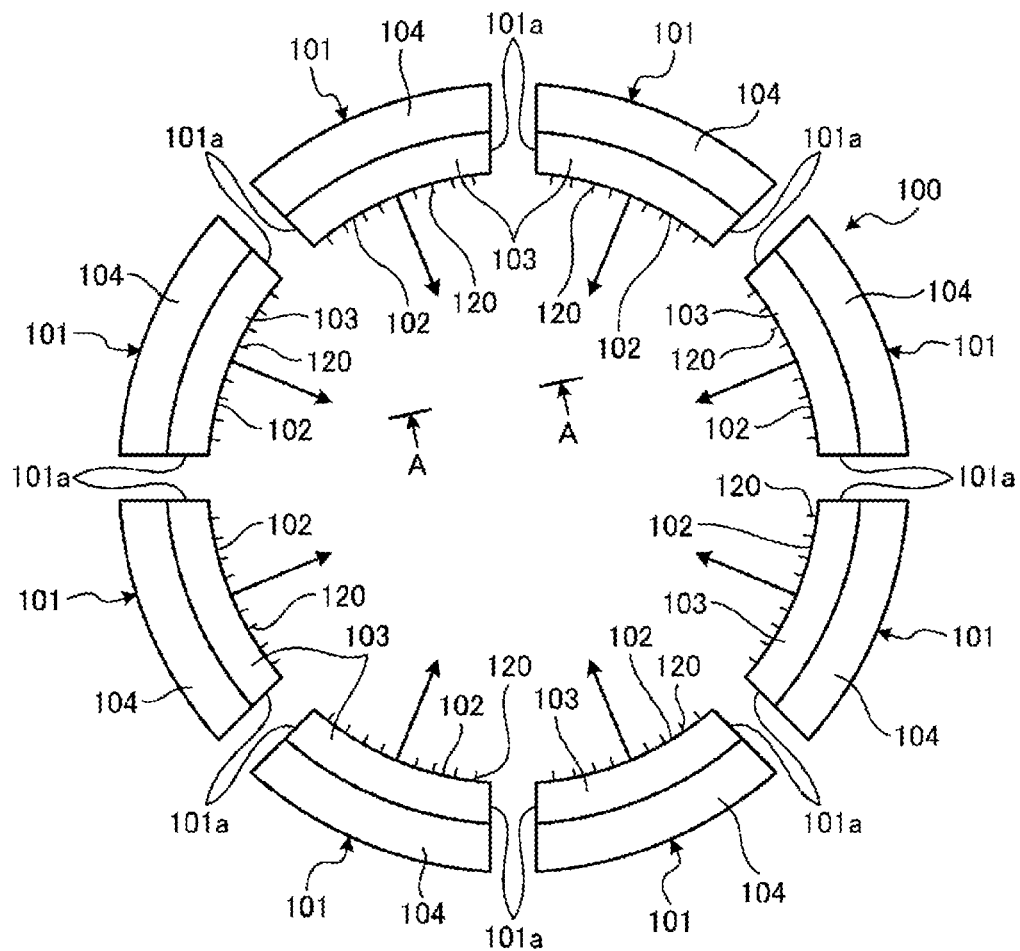
FIG. 2 is an explanatory diagram of a tire molding die for manufacturing a pneumatic tire according to an embodiment.

FIG. 2 is an explanatory diagram of the tire molding die 100 for manufacturing the pneumatic tire 1 according to an embodiment. As illustrated in FIG. 2, the tire molding die 100 is configured as a so-called sector mold corresponding to a divided tire molding die 100, and has an annular structure in which a plurality of sectors 101 separated from one another in the tire circumferential direction are connected to one another. Note that in FIG. 2, the tire molding die 100 is illustrated in the form of an eight-division structure including eight sectors 101, but the number of divisions of the tire molding die 100 is not limited to eight.

One sector 101 includes a plurality of pieces 103 for forming the tread portion 2 of the pneumatic tire 1 corresponding to a product, and a back block 104 in which the pieces 103 are mounted adjacent to one another. One piece 103 corresponds to a portion of the tread pattern divided at a constant pitch or any pitch, and includes a tread molding surface 102 for forming a part of the tread pattern. One sector 101 includes a plurality of pieces 103 in the tire circumferential direction and the tire width direction, respectively (not illustrated), and the plurality of pieces 103 are assembled to constitute the tread molding surface 102 of one sector 101. In other words, the piece 103 of one sector 101 is divided into a plurality of pieces 103.

In the back block 104, a plurality of pieces 103 are mounted and held in a predetermined arrangement. One sector 101 is thus configured.

The tire molding die 100 is configured by using a plurality of the sectors 101 configured as described above and connecting the plurality of sectors 101 in an annular shape. In the tire molding die 100, the plurality of sectors 101 are connected together in an annular shape to assemble the tread molding surfaces 102 of the sectors 101, forming the tread molding surface 102 of the entire tread pattern.

Figure 3:
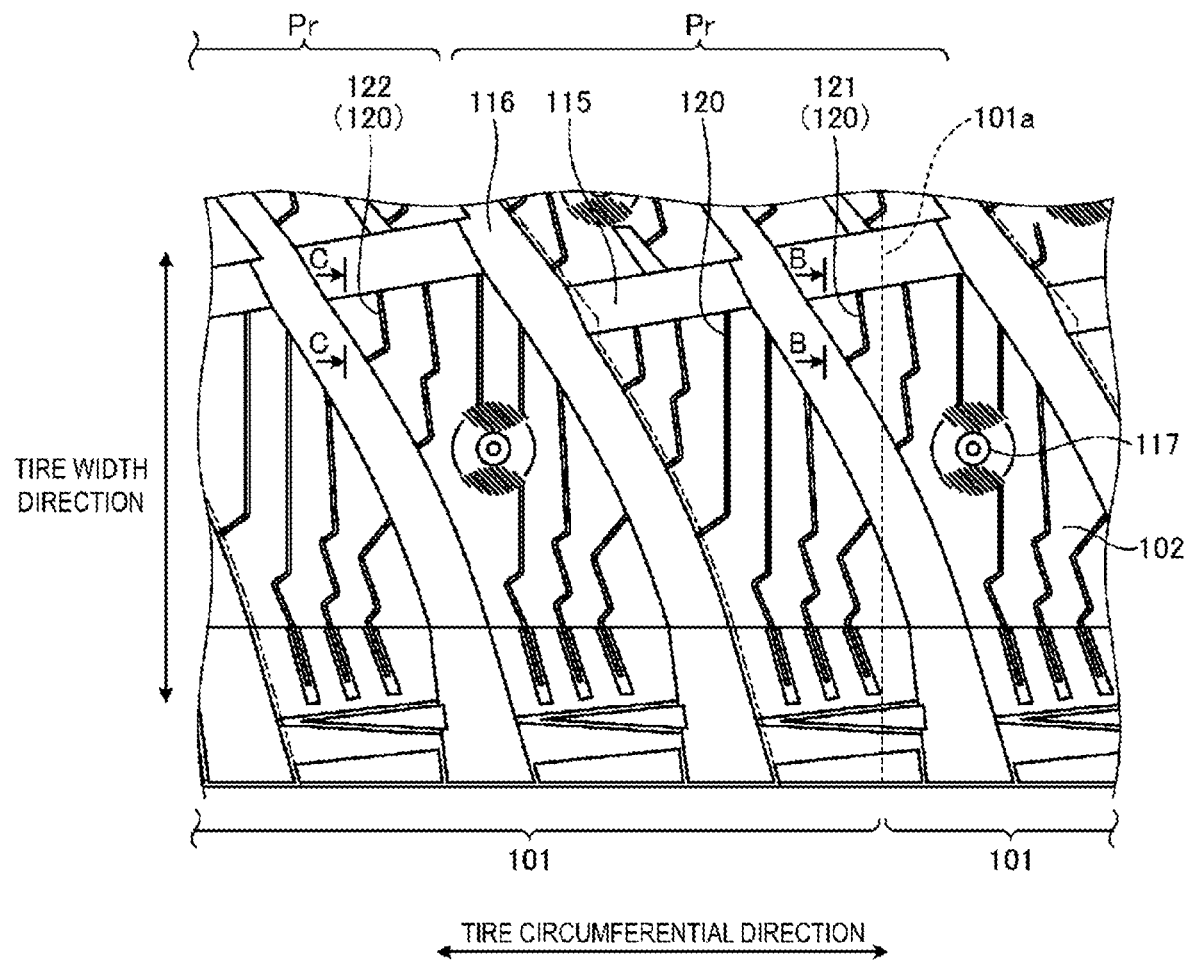
FIG. 3 is a view taken along A-A in FIG. 2 and is an explanatory diagram of a state in which sectors are connected together.

FIG. 3 is a view taken along A-A in FIG. 2, and is an explanatory diagram of a state in which the sectors 101 are connected together. In the tread molding surface 102 in each sector 101, a plurality of circumferential groove forming bones 115 are disposed that form the circumferential grooves 11 in the tread portion 2 of the pneumatic tire 1, a plurality of lug groove forming bones 116 are disposed that form the lug grooves 12, a plurality of pin hole forming pins 117 are disposed that form the pin holes 30, and a plurality of sipe blades 120 are disposed that form the sipes 20. In this regard, the circumferential groove forming bones 115 and the lug groove forming bones 116 are formed in a rib-like shape protruding from the tread molding surface 102, and the sipe blades 120 are formed as plate-like members formed from a metal material. For example, stainless steel is used as the metal material that forms the sipe blade 120.

Additionally, the sipe blades 120 are disposed on the tread molding surface 102 such that the sipe blades 120 are identical in number to the sipes 20 formed in the tread portion 2. The sipe blades 120 are disposed at positions in the tread molding surface 102 corresponding to positions in the tread portion 2 where the sipes 20 are disposed. Thus, like the sipes 20 formed in the tread portion 2 of the pneumatic tire 1, the sipe blades 120 are disposed repeatedly in the tire circumferential direction in the repeating pattern Pr corresponding to a predetermined arrangement pattern.

A near sipe blade 121, corresponding to the sipe blade 120 located closest to a division position 101a between the sectors 101 and included in the plurality of sipe blades 120 disposed in one sector 101, is more rigid than an original shape blade 122. The division position 101a between the sectors 101 in this case is an end portion of the sector 101 in the tire circumferential direction, and corresponds to a position where the sectors 101 adjacent to each other in the tire circumferential direction are connected to each other. Additionally, the near sipe blade 121 is typically disposed at a distance in a range of 10 mm from the division position 101a.

In addition, the original shape blade 122 in this case is the sipe blade 120 located in the repeating pattern Pr differing from the repeating pattern Pr including the near sipe blade 121 at a position identical to the position of the near sipe blade 121 in the repeating pattern Pr including the near sipe blade 121. In other words, the original shape blade 122 is the sipe blade 120 disposed in the repeating pattern Pr differing from the repeating pattern Pr including the near sipe blade 121 at a position corresponding to the position of the near sipe blade 121 within the repeating pattern Pr including the near sipe blade 121.

Note that in a case where the sipe blade 120 located in the repeating pattern Pr differing from the repeating pattern Pr including the near sipe blade 121 at the position identical to the position of the near sipe blade 121 in the repeating pattern Pr including the near sipe blade 121 corresponds to another near sipe blade 121 differing from the near sipe blade 121, as the original shape blade 122, the sipe blade 120 located in further another repeating pattern Pr at the position identical to the position of the near sipe blade 121 in the repeating pattern Pr including the near sipe blade 121 is preferably used.

Figure 4:
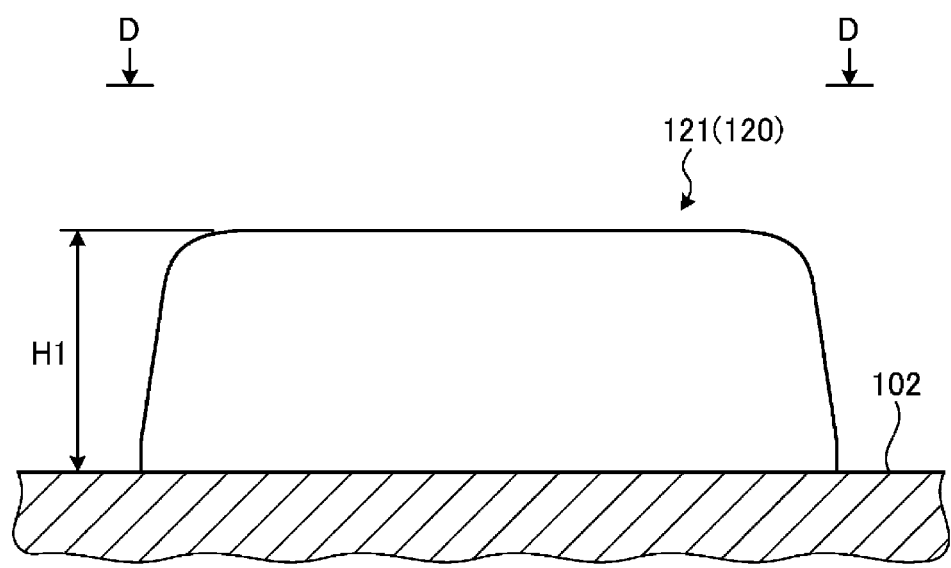
FIG. 4 is a cross-sectional view taken along B-B in FIG. 3, and is an explanatory diagram of the height of a near sipe blade.
Figure 5:
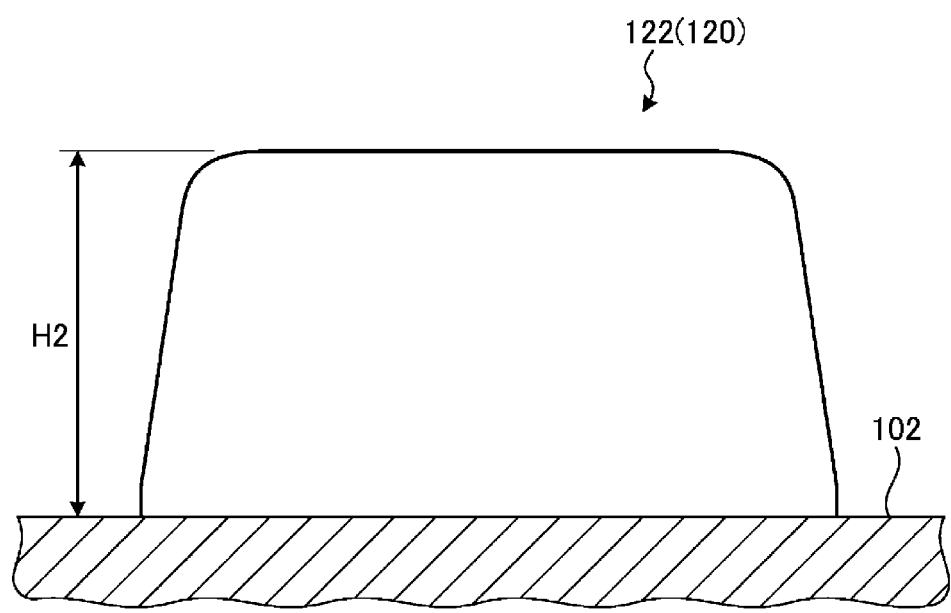
FIG. 5 is a cross-sectional view taken along C-C in FIG. 3, and is an explanatory diagram of the height of an original shape blade.

FIG. 4 is a cross-sectional view taken along B-B in FIG. 3, and is an explanatory diagram of the height of the near sipe blade 121. FIG. 5 is a cross-sectional view taken along C-C in FIG. 3 and is an explanatory diagram of the height of the original shape blade 122. The maximum height H1 of the near sipe blade 121 in the tire radial direction from the tread molding surface 102 is smaller than the maximum height H2 of the original shape blade 122 in the tire radial direction from the tread molding surface 102. Specifically, the near sipe blade 121 and the original shape blade 122 are configured such that a ratio of the maximum height H1 of the near sipe blade 121 to the maximum height H2 of the original shape blade 122 is in the range of $0.3 \leq (H1/H2) \leq 0.8$. The maximum height H1 of the near sipe blade 121 is smaller than the maximum height H2 of the original shape blade 122 as described above, and thus, the near sipe blade 121 is more rigid than the original shape blade 122.

Note that in the present embodiment, the height of the sipe blade 120 in the tire radial direction from the tread molding surface 102 is in the range of 1 mm or more and 15 mm or less. Thus, both the maximum height H1 of the near sipe blade 121 and the maximum height H2 of the original shape blade 122 are in the range of 1 mm or more and 15 mm or less.

Figure 6:
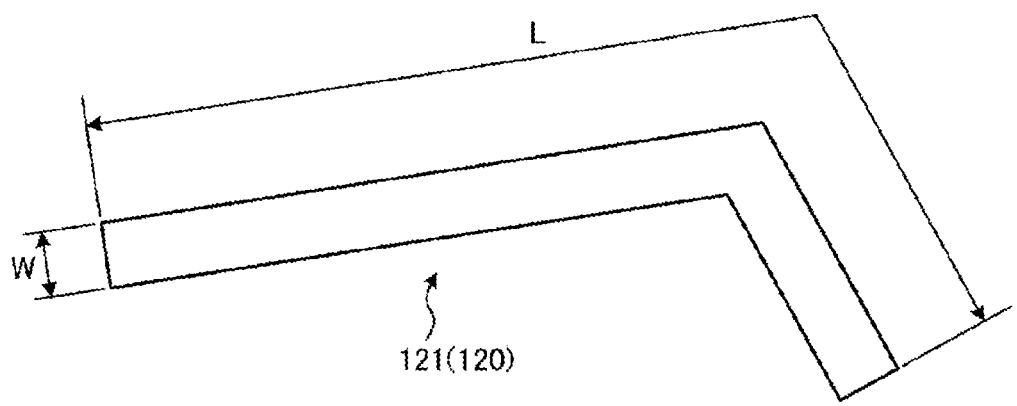
FIG. 6 is a cross-sectional view taken along D-D in FIG. 4.

FIG. 6 is a diagram taken along D-D in FIG. 4. The near sipe blade 121 has a relationship between a sipe volume V corresponding to the volume of the near sipe blade 121 and the maximum height H1 such that $V \propto H1$. That is, the near sipe blade 121 has a proportional relationship between the sipe volume V and the maximum height H1. The sipe volume V in this case is the product of the length L, the width W, and the maximum height H1 of the near sipe blade 121. The length L along the near sipe blade 121 is a direction along the extension direction of the near sipe blade 121 or a length along the shape of the near sipe blade 121, in a case where the near sipe blade 121 is viewed in the height direction.

Note that in the present embodiment, the thickness of the sipe blade 120 is in the range of 0.2 mm or more and 1.0 mm or less. Thus, the near sipe blade 121 and the width W are also in the range of 0.2 mm or more and 1.0 mm or less.

Tire Manufacturing Method

Figure 7:
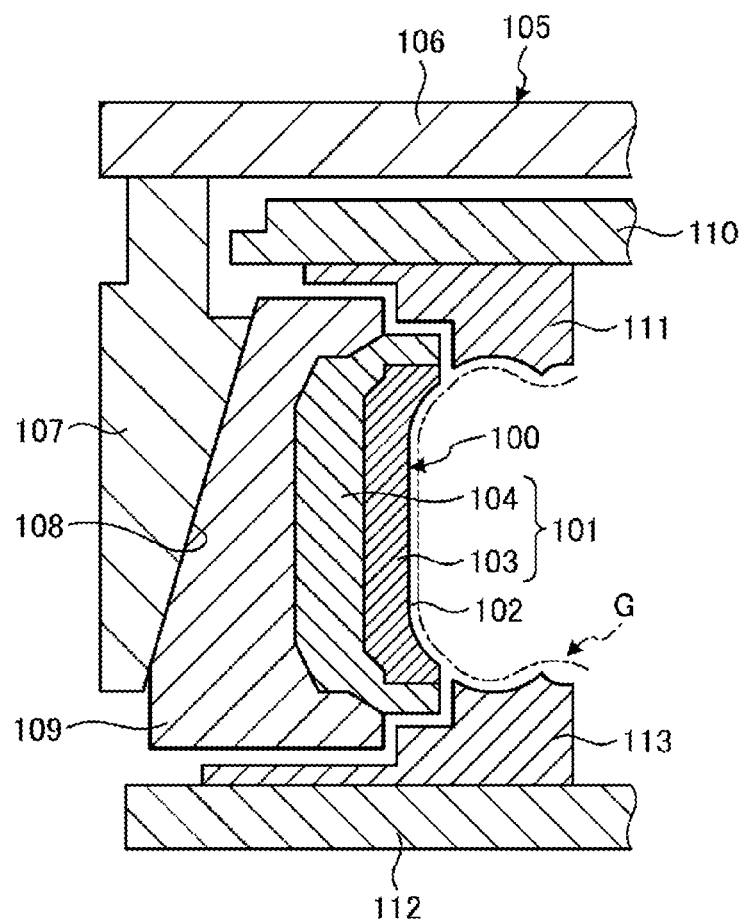
FIG. 7 is an explanatory diagram illustrating a tire manufacturing method using the tire molding die illustrated in FIG. 2.

Now, a manufacturing method for the pneumatic tire 1 using the tire molding die 100 according to an embodiment will be described. FIG. 7 is an explanatory diagram illustrating a tire manufacturing method using the tire molding die 100 illustrated in FIG. 2. FIG. 7 illustrates an axial cross-sectional view of the mold support device 105 including the tire molding die 100 illustrated in FIG. 2. The pneumatic tire 1 according to the present embodiment is manufactured in accordance with manufacturing steps described below.

First, various rubber members (not illustrated) that constitute the pneumatic tire 1, and members such as carcass plies (not illustrated) and belt plies (not illustrated) are applied to a molding machine to form a green tire G. Then, the green tire G is mounted on the mold support device 105 (see FIG. 7).

In FIG. 7, the mold support device 105 includes a support plate 106, an outer ring 107, a segment 109, a top plate 110 and a base plate 112, an upper side mold 111 and a lower side mold 113, and the tire molding die 100. The support plate 106 has a disc shape and is disposed in a horizontal plane. The outer ring 107 is an annular structure having a tapered surface 108 on an inner side in the radial direction, and is mounted and suspended from a lower portion of an outer peripheral edge of the support plate 106. The segment 109 is a divisible annular structure corresponding to the sectors 101 of the tire molding die 100 and is inserted into the outer ring 107 and disposed slidably in the axial direction relative to the tapered surface 108 of the outer ring 107. The top plate 110 is installed movably in the axial direction inside the outer ring 107 and between the segment 109 and the support plate 106. The base plate 112 is disposed below the support plate 106 and at a position opposite the support plate 106 in the axial direction.

The upper side mold 111 and the lower side mold 113 include molding surfaces with side profiles corresponding to both side surfaces of the pneumatic tire 1 in the tire width direction. Additionally, the upper side mold 111 and the lower side mold 113 are disposed such that the upper side mold 111 is attached to the lower surface side of the top plate 110, the lower side mold 113 is attached to the upper surface side of the base plate 112, and the molding surface of the upper side mold 111 faces the molding surface of the lower side mold 113. As described above, the tire molding die 100 has a divisible annular structure (see FIG. 2) with the tread molding surface 102 enabling a tread profile to be formed. Additionally, the sectors 101 of the tire molding die 100 are attached to the inner circumferential surfaces of the corresponding segments 109, and the tire molding die 100 is disposed such that the tread molding surface 102 faces the side where the molding surfaces of the upper side mold 111 and the lower side mold 113 are located.

Then, the green tire G is mounted between the molding surface of the tire molding die 100 and the molding surfaces of the upper side mold 111 and the lower side mold 113. At this time, the support plate 106 moves downward in the axial direction to move the outer ring 107 downward in the axial direction along with the support plate 106, and the tapered surface 108 of the outer ring 107 pushes the segments 109 radially inward. Then, the tire molding die 100 is contracted in diameter to annularly connect the molding surfaces of the sectors 101 of the tire molding die 100, and the entire molding surface of the tire molding die 100 is connected to the molding surface of the lower side mold 113. Additionally, the top plate 110 moves downward in the axial direction to lower the upper side mold 111, reducing the distance between the upper side mold 111 and the lower side mold 113. Then, the entire molding surface of the tire molding die 100 is connected to the molding surface of the upper side mold 111. Accordingly, the green tire G is surrounded and held by the molding surface of the tire molding die 100, the molding surface of the upper side mold 111, and the molding surface of the lower side mold 113.

Then, the green tire G corresponding to an unvulcanized tire is subjected to vulcanization molding. Specifically, the tire molding die 100 is heated, and the green tire G is expanded radially outward by a pressurizing device (not illustrated) and pressed against the tread molding surface 102 of the tire molding die 100. Then, the green tire G is heated, and rubber molecules and sulfur molecules in the tread portion 2 are bonded together, leading to vulcanization. Then, the tread molding surface 102 of the tire molding die 100 is transferred to the green tire G, forming the tread pattern in the tread portion 2.

Subsequently, the tire after vulcanization molding is acquired as a product tire corresponding to the pneumatic tire 1 provided as a product. At this time, the support plate 106 and the top plate 110 move upward in the axial direction to space the tire molding die 100, the upper side mold 111, and the lower side mold 113 apart from one another, opening the mold support device 105. In response to opening of the mold support device 105, the tire molding die 100 detaches from the mold support device 105 with the tire subjected to vulcanization molding.

Figure 8:
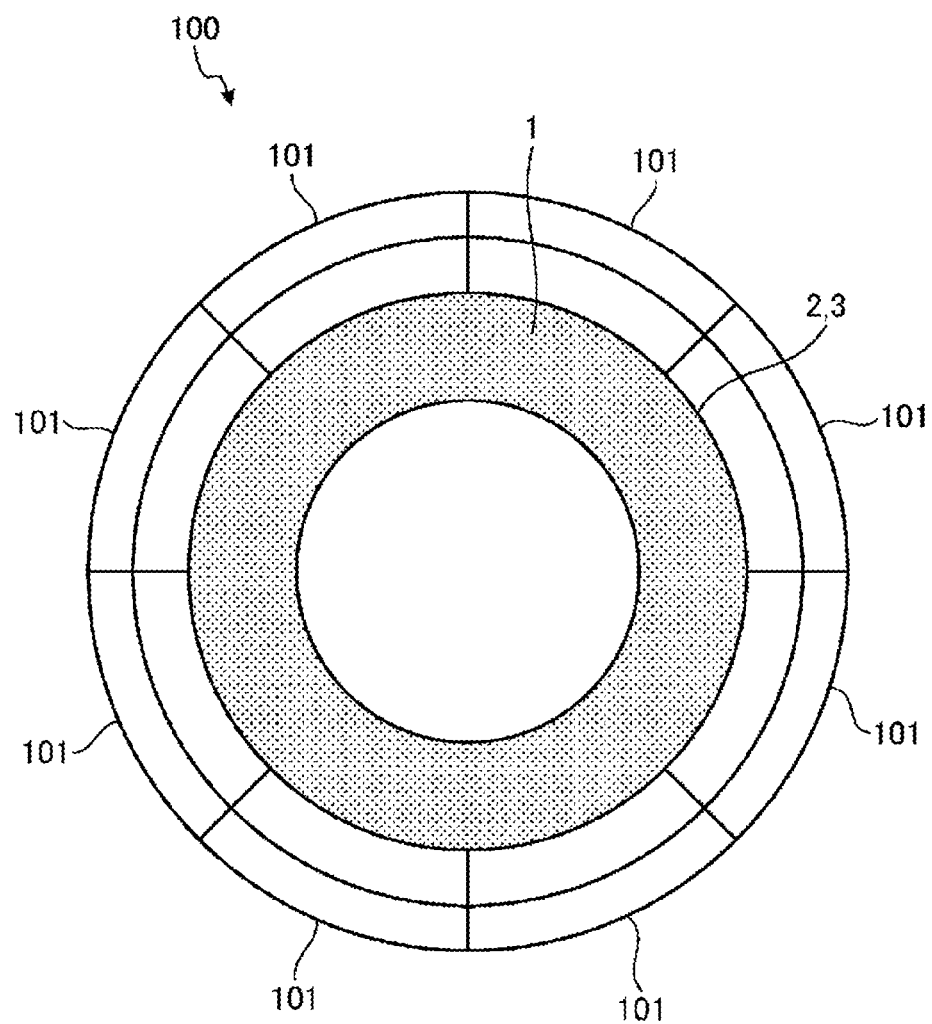
FIG. 8 is an explanatory diagram illustrating a state before the tire molding die is detached from a pneumatic tire 1 after vulcanization molding.

FIG. 8 is an explanatory diagram illustrating a state before the tire molding die 100 is detached from the pneumatic tire 1 after vulcanization molding. During vulcanization molding of the pneumatic tire 1 using the tire molding die 100, the tread portion 2 is formed by the tire molding die 100. Thus, immediately after vulcanization molding is performed, the tire molding die 100 is attached to the tread portion 2 of the pneumatic tire 1 (see FIG. 8). Specifically, the plurality of sectors 101 of the tire molding die 100 are connected in an annular shape, and the tire molding die 100 is attached to the tread portion 2 of the pneumatic tire 1 immediately after vulcanization molding is performed. In response to completion of the vulcanization molding of the pneumatic tire 1 and detachment, of the tire molding die 100 from the mold support device 105, the plurality of sectors 101 connected together in an annular shape and attached to the tread portion 2 of the pneumatic tire 1 are detached from the pneumatic tire 1. Accordingly, the tire molding die 100 is detached from the pneumatic tire 1.

Figure 9:
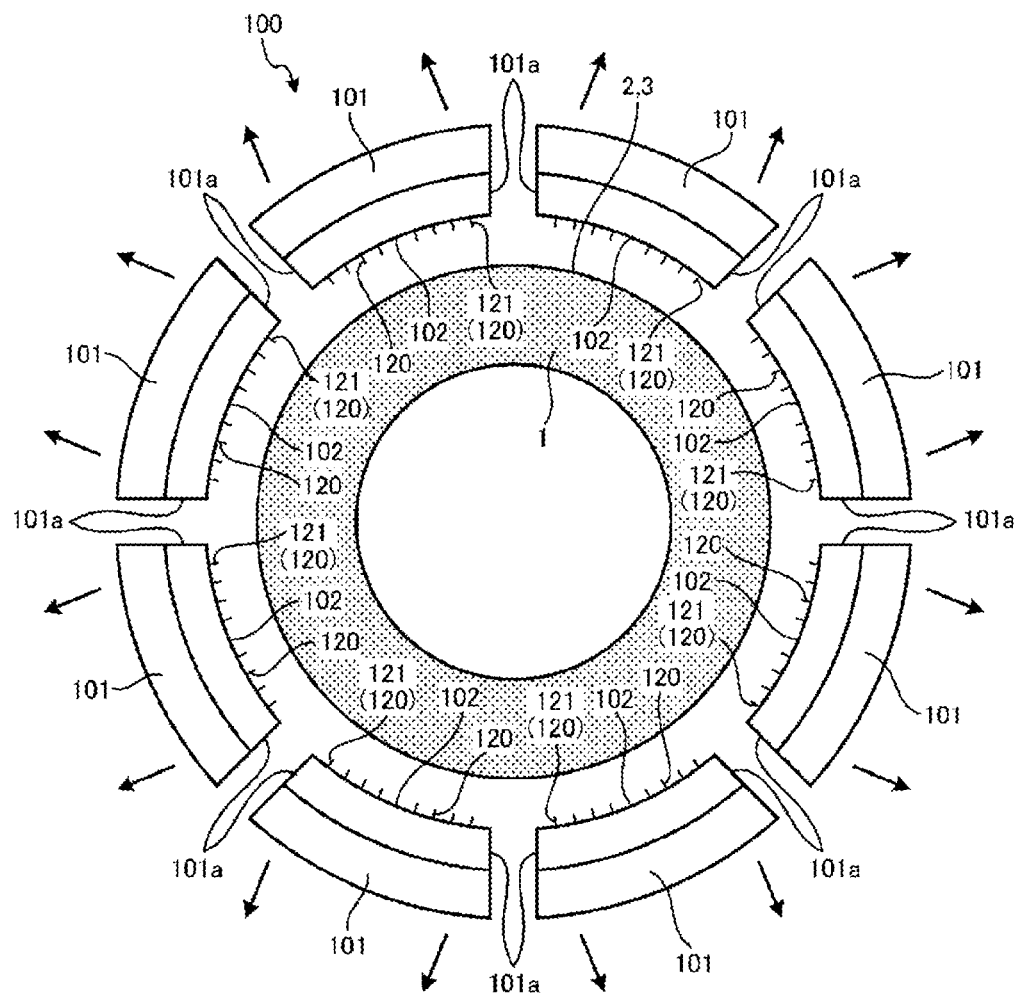
FIG. 9 is an explanatory diagram illustrating a state in which the tire molding die is detached from the pneumatic tire after vulcanization molding.

FIG. 9 is an explanatory diagram illustrating a state in which the tire molding die 100 is detached from the pneumatic tire 1 after vulcanization molding. In a case that the plurality of sectors 101 are detached from the pneumatic tire 1, the sectors 101 are moved toward the outer side in the tire radial direction and separated from the tread portion 2 of the pneumatic tire 1. Accordingly, the tire molding die 100 is detached from the pneumatic tire 1. In this case, during vulcanization molding of the pneumatic tire 1, the plurality of sipe blades 120 disposed on the tread molding surfaces 102 of the sectors 101 of the tire molding die 100 form a plurality of sipes 20 in the road contact surface 3 of the tread portion 2. In response to detachment of the sectors 101 of the tire molding die 100 from the pneumatic tire 1 by moving the sectors 101 toward the outer side in the tire radial direction, the plurality of sipe blades 120 disposed on the sectors 101 are extracted from the sipes 20 formed in the tread portion 2 of the pneumatic tire 1.

In this regard, the sipe blades 120 disposed on the tread molding surfaces 102 of the sector 101 extend from the tread molding surfaces 102 generally toward the inner side in the tire radial direction. On the other hand, in a case of detaching the sectors 101 from the pneumatic tire 1, the sectors 101 are moved toward the outer side in the tire radial direction. Thus, for the sipe blade 120 that is included in the plurality of sipe blades 120 disposed on one sector 101 and that is disposed in a central region of the sector 101 in the tire circumferential direction, the direction in which the sipe blade 120 extends from the tread molding surface 102 is similar to the direction in which the sector 101 is moved.

In contrast, for the sipe blade 120 that is included in the plurality of sipe blades 120 disposed on one sector 101 and that is disposed at or near the division position 101a between the sectors 101, the direction in which the sipe blade 120 extends from the tread molding surface 102 is inclined with respect to the direction in which the sector 101 is moved. In other words, in a case where the sectors 101 are detached from the pneumatic tire 1, one sector 101 is integrally moved, and thus, the direction in which the sector 101 is moved corresponds, even at or near the division position 101a between the sectors 101, to the direction in which a position in a central region of the sector 101 in the tire circumferential direction is moved toward the outer side in the tire radial direction. Thus, the direction of movement of the division position 101a between the sectors 101 during detachment of the sectors 101 from the pneumatic tire 1 differs from the tire radial direction, and thus, the direction in which the sipe blade 120 disposed at or near the division position 101a between the sectors 101 moves during detachment of the sectors 101 from the pneumatic tire 1 differs from the direction in which the sipe blades 120 extends from the tread molding surface 102.

In a case where the direction of movement of the sipe blades 120 during detachment of the sectors 101 from the pneumatic tire 1 differs from the direction in which the sipe blades 120 extend from the tread molding surface 102, the direction of movement of the sipe blades 120 differs from the depth direction of the sipes 20 formed by the sipe blades 120. In this case, because the force acts on the sipe blades 120 in a direction differing from the depth direction of the sipes 20 during movement of the sectors 101, a strong reaction force from the rubber member forming the sipes 20 acts on the sipe blades 120. In a case of detachment of the sectors 101 from the pneumatic tire 1, a reaction force from the rubber member forming the sipes 20 acts on the sipe blade 120 disposed at or near the division position 101a between the sectors 101, and is likely to cause failure such as bending or breakage of the sipe blade 120.

Such failure is likely to occur in the sipe blade 120 disposed at or near the division position 101a between the sectors 101 during detachment of the sectors 101. However, in the tire molding die 100 according to the present embodiment, the near sipe blade 121 disposed at or near the division position 101a between the sectors 101 is more rigid than the original shape blade 122. Thus, even in a case where the force during detachment of the sectors 101 from the pneumatic tire 1 acts in a direction differing from the depth direction of the sipe 20 formed by the near sipe blade 121, causing the reaction force from the rubber member forming the sipe 20 to act on the near sipe blade 121, possible failure in the near sipe blade 121 due to the reaction force can be suppressed. As a result, the durability of the sipe blades 120 can be improved.

Additionally, because the maximum height H1 of the near sipe blade 121 is smaller than the maximum height H2 of the original shape blade 122, the near sipe blade 121 can be reliably made more rigid than the original shape blade 122. In addition, because the maximum height H1 of the near sipe blade 121 is smaller than the maximum height H2 of the original shape blade 122, during detachment of the sectors 101 from the pneumatic tire 1, the near sipe blade 121 can be pulled out of the sipe 20 earlier. This enables a reduction in the time for which the reaction force from the rubber member forming the sipes 20 acts on the near sipe blade 121. Consequently, failure in the near sipe blade 121 such as bending of the near sipe blade 121 can be reliably suppressed, which failure is caused by the force acting on the near sipe blade 121 during detachment of the sectors 101 from the pneumatic tire 1. As a result, the durability of the sipe blades 120 can be reliably improved.

Additionally, because the ratio of the maximum height H1 of the near sipe blade 121 to the maximum height H2 of the original shape blade 122 is in the range of $0.3 \leq (H1/H2) \leq 0.8$, the sipes 20 can be formed that can reliably ensure performance on ice and snow and wet performance, and the durability of the sipe blades 120 can be reliably improved. Specifically, in a case where the ratio of the maximum height H1 of the near sipe blade 121 to the maximum height H2 of the original shape blade 122 is $(H1/H2)<0.3$, the maximum height H1 of the near sipe blade 121 is excessively small, and this may lead to an excessively small depth of the sipe 20 formed by the near sipe blade 121. The sipes 20 contribute to ensuring performance on ice and snow and wet performance, but an excessively small depth of the sipe 20 may cause difficulty in ensuring performance on ice and snow and wet performance. Additionally, an excessively small depth of the sipe 20 formed by the near sipe blade 121 causes the sipe 20 to be worn earlier than the other sipes 20, and this may degrade the appearance. Additionally, in a case where the ratio of the maximum height H1 of the near sipe blade 121 to the maximum height H2 of the original shape blade 122 is $(H1/H2)>0.8$, the maximum height H1 of the near sipe blade 121 is excessively large, and this may cause difficulty in making the near sipe blade 121 more rigid than the original shape blade 122. Additionally, an excessively large maximum height H1 of the near sipe blade 121 may cause difficulty in pulling the near sipe blade 121 early from the sipe 20 during detachment of the sectors 101 from the pneumatic tire 1, and this may in turn cause difficulty in shortening the time for which the reaction force from the rubber member forming the sipe 20 acts on the near sipe blade 121.

In contrast, in a case where the ratio of the maximum height H1 of the near sipe blade 121 to the maximum height H2 of the original shape blade 122 is in the range of $0.3 \leq (H1/H2) \leq 0.8$, the depth of the sipe 20 formed by the near sipe blade 121 can be ensured. Thus, performance on ice and snow and wet performance can be reliably ensured, and at the time of wear of the tread portion 2, degradation of the appearance can be suppressed. Furthermore, the near sipe blade 121 can be reliably made more rigid than the original shape blade 122, and the time for which the reaction force from the rubber member forming the sipe 20 acts on the near sipe blade 121 can be shortened during the detachment of the sectors 101 from the pneumatic tire 1, allowing failure in the near sipe blade 121 to be reliably suppressed. As a result, the sipes 20 can be formed that can reliably ensure performance on ice and snow and wet performance, and the durability of the sipe blades 120 can be reliably improved.

In addition, because the relationship between the sipe volume V and the maximum height H1 is $V \propto H1$ in the near sipe blade 121, the near sipe blade 121 can be reliably made more rigid. In other words, because the near sipe blade 121 has a proportional relationship between the sipe volume V and the maximum height H1, the maximum height H1 of the near sipe blade 121 decreases consistently with the length L and the width W. Thus, the near sipe blade 121 can be reliably made more rigid than the original shape blade 122, and bending of the near sipe blade 121 can be reliably suppressed. As a result, the durability of the sipe blades 120 can be reliably improved.

Modified Examples

Figure 10:
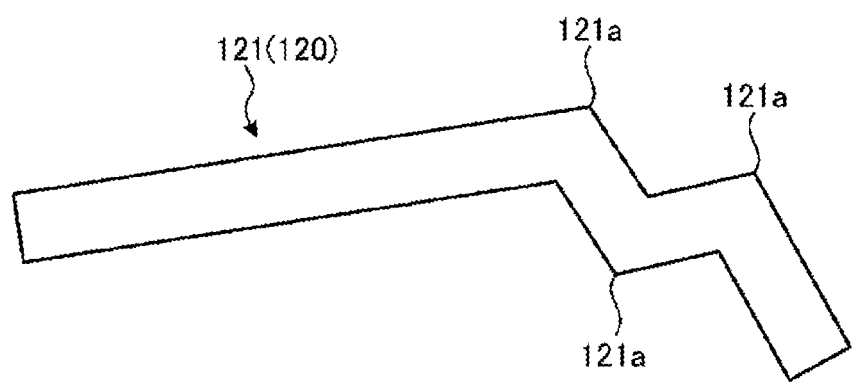
FIG. 10 is a schematic plan view of a near sipe blade in a modified example of the tire molding die according to an embodiment.
Figure 11:
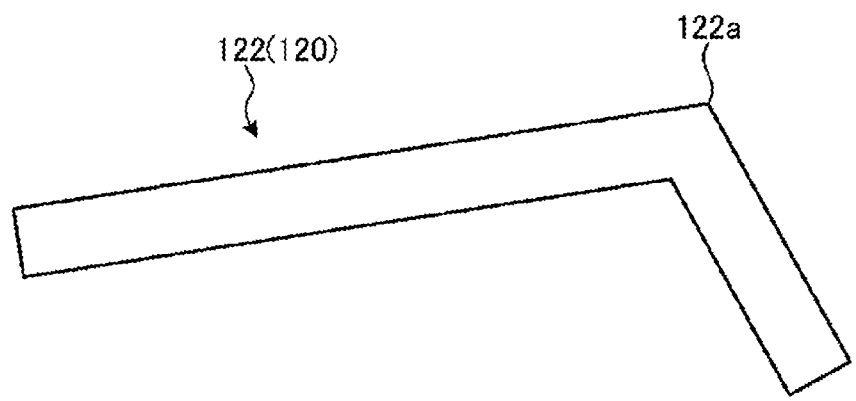
FIG. 11 is a schematic plan view of an original shape blade in a modified example of the tire molding die according to an embodiment.

Note that in the embodiment described above, the near sipe blade 121 and the original shape blade 122 are formed with identical shapes except for the maximum height, but may differ from each other in shapes other than the maximum height. FIG. 10 is a modified example of the tire molding die 100 according to an embodiment, and is a schematic plan view of the near sipe blade 121. FIG. 11 is a modified example of the tire molding die 100 according to an embodiment, and is a schematic plan view of the original shape blade 122. The near sipe blade 121 and the original shape blade 122 may be configured such that the number A1 of bend points 121a of the near sipe blade 121 differs from the number A2 of bend points 122a of the original shape blade 122. In this case, the relationship between the number A1 of bend points 121a of the near sipe blade 121 and the number A2 of the bend points 122a of the original shape blade 122 is preferably A2<A1.

The number A1 of the bend points 121a of the near sipe blade 121 is preferably greater than the number A2 of the bend points 122a of the original shape blade 122, for example, as illustrated in FIGS. 10 and 11, the number A1 of the bend points 121a of the near sipe blade 121 is three, and the number A2 of the bend points 122a of the original shape blade 122 is one, and the like. By making the number A1 of the bend points 121a of the near sipe blade 121 greater than the number A2 of the bend points 122a of the original shape blade 122, the near sipe blade 121 can be reliably made more rigid than the original shape blade 122. Accordingly, failure in the near sipe blade 121 such as bending of the near sipe blade 121 can be reliably suppressed. As a result, the durability of the sipe blades 120 can be reliably improved.

Note that the number A1 of the bend points 121a of the near sipe blade 121 and the number A2 of the bend points 122a of the original shape blade 122 are preferably each in the range of 1 or more and 10 or less.

Additionally, in the embodiment described above, the plurality of sipe blades 120 included in the tire molding die 100 are all made of an identical material, but the material may vary between sipe blades 120 as necessary. The near sipe blade 121 and the original shape blade 122 may differ from each other in material such that, for example, the relationship between the material strength S1 of the near sipe blade 121 and the material strength S2 of the original shape blade 122 is S2<S1. In this case, the material strength S1 of the near sipe blade 121 and the material strength S2 of the original shape blade 122 include, for example, the tensile strength and hardness of the material forming the near sipe blade 121 and the original shape blade 122. Thus, in a case where, for example, tensile strength is used as the material strength compared between the near sipe blade 121 and the original shape blade 122, the tensile strength of the material forming the near sipe blade 121 is preferably greater than the tensile strength of the material forming the original shape blade 122.

In this way, the relationship between the material strength S1 of the near sipe blade 121 and the material strength S2 of the original shape blade 122 is S2<S1, thus allowing the near sipe blade 121 to be reliably made more rigid than the original shape blade 122. Accordingly, failure in the near sipe blade 121 such as bending of the near sipe blade 121 can be reliably suppressed. As a result, the durability of the sipe blades 120 can be reliably improved.

Additionally, the near sipe blade 121 and the original shape blade 122 preferably have a relationship between the surface roughness R1 of the near sipe blade 121 and the surface roughness R2 of the original shape blade 122 such that R2>R1. In this case, as the surface roughness R1 of the near sipe blade 121 and the surface roughness R2 of the original shape blade 122, so-called arithmetic mean roughness Ra is used, for example. Because the surface roughness R1 of the near sipe blade 121 is smaller than the surface roughness R2 of the original shape blade 122, frictional resistance offered in response to pullout of the near sipe blade 121 from the sipe 20 can be made smaller than the frictional resistance offered in response to pullout of the original shape blade 122 from the sipe 20. Thus, in a case where the sectors 101 of the tire molding die 100 are detached from the pneumatic tire 1 after vulcanization molding, the near sipe blade 121 can be easily pulled out from the sipe 20, and even in a case where the reaction force from the rubber member forming the sipe 20 acts on the near sipe blade 121, failure in the near sipe blade 121 such as bending of the near sipe blade 121 can be reliably suppressed. As a result, the durability of the sipe blades 120 can be reliably improved.

Additionally, the sipe 20 may be a closed sipe that is at both end portions terminated within the land portion 15 in the length direction of the sipe 20, or an open sipe that at both end portions opens into the groove 10 in the length direction of the sipe 20, or a semi-closed sipe that is at one end portion terminated within the land portion 15 and at the other end portion opens into the groove 10 in the length direction of the sipe 20. Additionally, the pin holes 30 need not be formed in the tread portion 2 of the pneumatic tire 1, that is, the pin hole forming pins 117 need not be provided on the tire molding die 100. Additionally, the tread pattern of the pneumatic tire 1 obtained by vulcanization molding using the tire molding die 100 is not limited to the tread pattern illustrated in the embodiment.

EXAMPLES

FIG. 12 is a table showing results of performance evaluation tests of tire molding dies. In relation to the tire molding die 100 described above, the performance evaluation tests will be described that were conducted on a tire molding die of Conventional Example and the tire molding die 100 according to an embodiment of the present technology. The performance evaluation tests were conducted on the durability of the tire molding die.

The performance evaluation tests were conducted by evaluating the durability of the tire molding die when the pneumatic tire 1 having a tire nominal size of 205/55R16 94T, defined by JATMA, was vulcanization molded using the tire molding die. The method for evaluating the durability of the tire molding die includes, after vulcanization molding of the pneumatic tire 1, checking the near sipe blades 121, which are likely to be bent, for bending, repairing the near sipe blades 121 bent by 5° or more, and measuring the number of the near sipe blades 121 repaired. Furthermore, after vulcanization molding was performed 5000 times, the total number of the near sipe blades 121 repaired was calculated, and the reciprocals of the totals calculated were expressed as index values with the Conventional Example being assigned the value of 100. Larger values indicate a smaller number of the near sipe blade 121 repaired and superior mold durability.

The performance evaluation tests were conducted on nine types of tire molding dies including a Conventional Example as an example of a known tire molding die and Examples 1 to 8 of the tire molding die 100 according to an embodiment of the present technology. Among the tire molding dies, Conventional Example includes the near sipe blade 121 having rigidity comparable to the rigidity of the original shape blade 122.

In contrast, in all of Examples 1 to 8, corresponding to examples of the tire molding die 100 according to the present technology, the near sipe blade 121 is more rigid than the original shape blade 122. Furthermore, the tire molding dies 100 according to Examples 1 to 8 differ in the maximum height H1 of the near sipe blade 121, the ratio (H1/H2) of the maximum height H1 of the near sipe blade 121 to the maximum height H2 of the original shape blade 122, whether the sipe volume V and the maximum height H1 of the near sipe blade 121 are in a proportional relationship, the relative relationship between the number A1 of bend points 121a of the near sipe blade 121 and the number A2 of bend points 122a of the original shape blade 122, the relative relationship between the material strength S1 of the near sipe blade 121 and the material strength S2 of the original shape blade 122, and the relative relationship between the surface roughness R1 of the near sipe blade 121 and the surface roughness R2 of the original shape blade 122.

Note that the relative relationship between the material strength S1 of the near sipe blade 121 and the material strength S2 of the original shape blade 122 in the performance evaluation tests corresponds to the relative relationship between the tensile strength of the member forming the near sipe blade 121 and the tensile strength of the member forming the original shape blade 122.

The results of the performance evaluation tests using these tire molding dies 100 indicate that, as shown in FIG. 12, the tire molding dies 100 according to Examples 1 to 8 can suppress possible bending of the near sipe blade 121 and improve the durability of the near sipe blade 121 compared to Conventional Example. In other words, the tire molding dies 100 according to Examples 1 to 8 can improve the durability of the sipe blades 120.

The invention claimed is:

1. A tire molding die comprising: a plurality of sectors separated from one another in a tire circumferential direction; and a plurality of sipe blades disposed on tread molding surfaces of the sectors, the sipe blades being disposed repeatedly in the tire circumferential direction in a repeating pattern corresponding to a predetermined arrangement pattern, a near sipe blade that is comprised in a plurality of the sipe blades disposed in one of the sectors and that is closest to a division position between the sectors being more rigid than an original shape blade corresponding to the sipe blade provided in the repeating pattern differing from the repeating pattern comprising the near sipe blade at a position identical to a position of the near sipe blade in the repeating pattern comprising the near sipe blade wherein the near sipe blade and the original shape blade have a relationship between a surface roughness R1 of the near sipe blade and a surface roughness R2 of the original shape blade such that R2>R1.

2. The tire molding die according to claim 1, wherein a maximum height of the near sipe blade is smaller than a maximum height of the original shape blade.

3. The tire molding die according to claim 1, wherein a ratio of a maximum height H1 of the near sipe blade to a maximum height H2 of the original shape blade is in a range $0.3 \leq (H1/H2) \leq 0.8$.

4. The tire molding die according to claim 1, wherein the near sipe blade has a relationship between a maximum height H1 of the near sipe blade and a sipe volume V corresponding to a product of a length L, a width W, and the maximum height H1 of the near sipe blade such that $V \propto H1$.

5. The tire molding die according to claim 1, wherein the near sipe blade and the original shape blade have a relationship between a number of bend points A1 of the near sipe blade and a number of bend points A2 of the original shape blade such that A2<A1.

6. The tire molding die according to claim 1, wherein a the near sipe blade and the original shape blade have a relationship between a material strength S1 of the near sipe blade and a material strength S2 of the original shape blade such that S2<S1.

7. The tire molding die according to claim 2, wherein a ratio of a maximum height H1 of the near sipe blade to a maximum height H2 of the original shape blade is in a range $0.3 \leq (H1/H2) \leq 0.8$.

8. The tire molding die according to claim 7, wherein the near sipe blade has a relationship between the maximum height H1 and a sipe volume V corresponding to a product of a length L, a width W, and the maximum height H1 of the near sipe blade such that $V \propto H1$.

9. The tire molding die according to claim 8, wherein the near sipe blade and the original shape blade have a relationship between a number of bend points A1 of the near sipe blade and a number of bend points A2 of the original shape blade such that A2<A1.

10. The tire molding die according to claim 9, wherein a the near sipe blade and the original shape blade have a relationship between a material strength S1 of the near sipe blade and a material strength S2 of the original shape blade such that S2<S1.

* * * * *